Patented Oct. 7, 1924.

1,510,526

UNITED STATES PATENT OFFICE.

GUY C. ROBINSON, OF STAMFORD, CONNECTICUT, ASSIGNOR TO ATLAS POWDER COMPANY, OF WILMINGTON, DELAWARE, A CORPORATION OF DELAWARE.

PRODUCTION OF BUTYL ALCOHOL AND ACETONE BY THE FERMENTATION OF MOLASSES.

No Drawing.     Application filed July 11, 1922. Serial No. 574,304.

*To all whom it may concern:*

Be it known that I, GUY C. ROBINSON, a citizen of the United States, residing at Stamford, in the county of Fairfield and State of Connecticut, have invented certain new and useful Improvements in the Production of Butyl Alcohol and Acetone by the Fermentation of Molasses, of which the following is a specification.

This invention relates to a process whereby low grade molasses, such as blackstrap and other waste sugar-house residues and liquors, either alone or in conjunction with cereal grain mashes, such as corn, barley, etc., may be advantageously utilized in the butyl fermentation process as described so fully in the literature of the art. Known processes of the character described have involved the use of only those carbohydrate materials which are rich in starch and which are of great value as foods. The present invention however involves the utilization of waste-products which are substituted in part or wholly for these more useful food materials.

I have discovered that all the sugars present in molasses, such as blackstrap, namely, glucose, fructose, sucrose, and raffinose, are fermented readily by organisms of the granulobacter type which are suitable for the butyl alcohol fermentation. Furthermore I have discovered that molasses is deficient in available nitrogen and also that it contains various toxic constituents, such as polyphenols, etc., and mineral salts which retard the fermentation when performed in the ordinary manner.

Now, I have invented a new and improved method whereby successful and complete fermentations can be carried out with molasses alone or with mixtures of molasses and corn or other cereal mashes in various proportions.

Other novel features of my process and other advantages thereof will be apparent from the following description.

During the course of a detailed investigation of the utilization of blackstrap molasses I found that the mineral ash isolated from such molasses possessed a toxic influence on the normal growth and development of bacteria of different types. This inhibition was very marked in the fermentation of corn mash with bacteria of the granulobacter type and it was discovered that this inhibition was due to the prevention of normal cell division. From this I concluded that if this interference with cell multiplication could be prevented, molasses would ferment normally as do cereal mashes and pure sugar solutions. Being aware that the first stage of the normal butyl fermentation is the stage of rapid cell division, I conceived the idea of adding the molasses to a normally fermenting corn or other cereal mash after this first stage of rapid cell division has reached its height. Under these conditions I found that the molasses fermented through normally and completely.

I have also discovered that a molasses mash can be fermented satisfactorily by adding a large volume of seed culture previously prepared in corn meal mash.

I have furthermore discovered that molasses yields a more rapid fermentation accompanied by better yields of neutral volatile products, if it is first purified by treatment with an activated decolorizing carbon, such as "Darco" or "Norit," so as to remove toxic principals, such as polyphenols, etc.

To illustrate the principle of my invention I may give the following specific examples:—

Example 1.—One kilo of blackstrap molasses is diluted to 10 litres with water and sterilized. In 10 litres of water are next mashed 250 grams of cornmeal which is then sterilized and inoculated with 100 cc. of active butyl culture of any suitable sort such as the granulobacters. At the end of 24 hours when the slide under the microscope shows numerous cells in the mash, the 10 litres of sterile molasses mash is run in at the bottom of the vessel without unnecessary agitation. The fermentation continues normally and is complete in a further 36 or 48 hours. The neutral volatile products, consisting of acetone and butyl and ethyl alcohols are then distilled off and rectified according to any one of the customary methods.

Example 2.—Six litres of cornmeal mash containing 300 grams of corn are set in active fermentation with a butyl culture until it is observed that the stage of rapid cell division is at its maximum, at which time the mash is transferred to 10 litres of sterilized dilute molasses containing 1 kilo of blackstrap. The fermentation is complete in two days and the volatile products can be removed in the usual way.

Example 3.—One kilo of blackstrap molasses diluted to 10 litres is treated with 200 grams of any good decolorizing carbon, preferably "Darco," and heated at about 80 degrees C. for about 20 minutes. The solution is then filtered and the resulting sugar solution sterilized for inoculation. This is performed according to one of the above described methods and the fermentation allowed to proceed to completion. Under these conditions I have discovered that the neutral products are formed much sooner than in fermentations in which untreated molasses is used. This fact is of considerable economic importance in the industry as a time saver.

While I have described in detail the preferred practice of my process it is to be understood that I am not limited to the above specific examples, but that these are given merely for purposes of illustration of the principles involved therein. Furthermore, I do not wish to convey the thought that I am limited to the ratios of corn and molasses mentioned, since these may vary all the way from equal parts of corn and molasses to pure molasses with no corn whatsoever. When molasses alone is employed I have found it beneficial to supply some suitable form of available nitrogen, such as protein, peptones, or other degraded protein substances. However in order to both insure a suitable nitrogen supply and to secure the most satisfactory fermentations I prefer to use a ratio of about 3 parts corn to 10 parts molasses. Other proportions may be successfully employed and different modes of mixing can be resorted to without departure from the spirit of my invention or the scope of the subjoined claims.

Having described my invention what I claim is:

1. In a process of utilizing low grade molasses in butyl alcohol and acetone fermentation, the improvement which comprises purifying the molasses with an activated decolorizing carbon to thereby prevent interference with cell division by the toxic constituents of the molasses and thereafter adding to the molasses a mass of fermenting cereal material in which the cell division of the ferment producing organisms is well advanced.

2. In a process of utilizing low grade molasses in butyl alcohol and acetone fermentation, the improvement which comprises purifying the molasses with an activated decolorizing carbon to thereby prevent interference with cell division by the toxic constituents of the molasses and thereafter bringing together the said molasses and a mass of higher grade fermenting carbohydrate material in which the cell division of the ferment producing organism has already reached an advanced stage.

In testimony whereof I affix my signature in the presence of two witnesses.

GUY C. ROBINSON.

Witnesses:
ARNOLD M. TAYLOR,
H. J. HOFFMAN.